US012291023B2

(12) United States Patent
Kii

(10) Patent No.: US 12,291,023 B2
(45) Date of Patent: May 6, 2025

(54) MEDIUM CONVEYANCE DEVICE AND RECORDING DEVICE

(71) Applicant: SEIKO EPSON CORPORATION, Tokyo (JP)

(72) Inventor: Soichiro Kii, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 189 days.

(21) Appl. No.: 18/313,068

(22) Filed: May 5, 2023

(65) Prior Publication Data

US 2023/0356535 A1 Nov. 9, 2023

(30) Foreign Application Priority Data

May 9, 2022 (JP) ................................ 2022-076910

(51) Int. Cl.

*B41J 11/00* (2006.01)
*B41J 3/60* (2006.01)
(Continued)

(52) U.S. Cl.

CPC ............ *B41J 11/0045* (2013.01); *B41J 3/60* (2013.01); *B41J 11/0095* (2013.01); *B41J 13/009* (2013.01); *B65H 15/016* (2020.08); *B65H 29/58* (2013.01); *B65H 29/60* (2013.01); *B65H 2402/441* (2013.01); *B65H 2402/45* (2013.01); *B65H 2403/5333* (2013.01); *B65H 2404/632* (2013.01); *B65H 2555/10* (2013.01);
(Continued)

(58) Field of Classification Search

CPC ...... B41J 11/0045; B41J 3/60; B41J 11/0095; B41J 13/009; B65H 15/016; B65H 29/58; B65H 29/60; B65H 2402/441; B65H 2402/45; B65H 2403/5333; B65H 2404/632; B65H 2555/10; B65H 2555/11; B65H 2601/11; B65H 2801/06

See application file for complete search history.

(56) References Cited

U.S. PATENT DOCUMENTS 6,371,471 B1 * 4/2002 Fukazu .................. B65H 45/18
270/58.08
2008/0284090 A1 * 11/2008 Honda .................. B65H 29/12
271/225

(Continued)

FOREIGN PATENT DOCUMENTS

JP 2001-034123 A 2/2001
JP 2007-112592 A 5/2007

(Continued)

*Primary Examiner* — Henok D Legesse
(74) *Attorney, Agent, or Firm* — WORKMAN NYDEGGER

(57) ABSTRACT

A plunger of a solenoid includes a pin member that moves in a groove portion of a link member in association with a displacement operation, the solenoid regulates the posture of a path switching member in a suction state, a contact surface that is an inner surface of the groove portion and with which the pin member comes into contact when the plunger moves in a suction direction is formed in a non-linear shape to have a first region extending in a first direction and a second region extending in a second direction intersecting the first direction, and an angle formed by the suction direction and the second direction is smaller than an angle formed by the suction direction and the first direction.

14 Claims, 13 Drawing Sheets

(51) Int. Cl.

| | |
|---|---|
| ***B41J 13/00*** | (2006.01) |
| ***B65H 15/00*** | (2006.01) |
| ***B65H 29/58*** | (2006.01) |
| ***B65H 29/60*** | (2006.01) |

(52) U.S. Cl.

CPC ...... *B65H 2555/11* (2013.01); *B65H 2601/11* (2013.01); *B65H 2801/06* (2013.01)

(56) References Cited

U.S. PATENT DOCUMENTS

| | | | | |
|---|---|---|---|---|
| 2014/0159303 | A1* | 6/2014 | Suzuki | G03G 15/234<br>271/226 |
| 2020/0102171 | A1* | 4/2020 | Ishifune | B65H 29/68 |
| 2020/0209797 | A1* | 7/2020 | Ikegami | G03G 15/6552 |

FOREIGN PATENT DOCUMENTS

| | | | |
|---|---|---|---|
| JP | 2008-285279 | A | 11/2008 |
| JP | 2021-095264 | A | 6/2021 |

* cited by examiner

MEDIUM CONVEYANCE DEVICE AND RECORDING DEVICE

The present application is based on, and claims priority from JP Application Serial Number 2022-076910, filed May 9, 2022, the disclosure of which is hereby incorporated by reference herein in its entirety.

BACKGROUND

1. Technical Field

The present disclosure relates to a medium conveyance device and a recording device.

2. Related Art

JP-A-2001-34123 discloses a device in which a folding path is coupled to a folding conveyance horizontal path as a branched conveyance path, and the conveyance path is switched from the folding conveyance horizontal path to the folding path by rotation of a folding path selection flapper. A solenoid is used to drive the path selection flapper. In a state where the solenoid is not electrified, the path selection flapper is biased by a spring in a direction in which the folding path is selected.

An engagement shaft is provided on an output shaft of the solenoid, and the engagement shaft is inserted into a U-shaped groove of an arm member provided in the path selection flapper. When the output shaft of the solenoid moves, the engagement shaft applies an external force to the arm member to rotate the path selection flapper. At this time, the engagement shaft provided in the output shaft of the solenoid moves in the U-shaped groove of the arm member.

When the posture of the path selection flapper is regulated by the output shaft at the time of solenoid suction, the posture of the path selection flapper varies due to component accuracy and assembly accuracy, and there is a concern that a sheet may be caught.

SUMMARY

In order to solve the above-described problems, there is provided a medium conveyance device of the present disclosure, the medium conveyance device including a branching portion where a conveyance path of a medium branches into a first conveyance path and a second conveyance path, a path switching member that is a member provided in the branching portion and rotates to switch between a first state where a moving direction of the medium is set to the first conveyance path and a second state where the moving direction of the medium is set to the second conveyance path, a solenoid that rotates the path switching member by a plunger configured to be displaced in a suction direction and a return direction opposite to the suction direction, and a link member that is a member provided in the path switching member and engages with the plunger, in which the link member includes a groove portion, the plunger includes a pin member that moves in the groove portion in association with the displacement operation, the solenoid regulates, in a suction state, a posture of the path switching member in the second state, a contact surface that is an inner surface of the groove portion and with which the pin member comes into contact when the plunger moves in the suction direction is formed in a non-linear shape to have a first region and a second region, the first region being a region extending in a first direction away from the center of rotation of the path switching member, and the second region being a region extending in a second direction away from the center of rotation and intersecting the first direction, and an angle formed by the suction direction and the second direction is smaller than an angle formed by the suction direction and the first direction.

In addition, a medium conveyance device of the present disclosure is a medium conveyance device including a branching portion where a conveyance path of a medium branches into a first conveyance path and a second conveyance path, a path switching member that is a member provided in the branching portion and rotates to switch between a first state where a moving direction of the medium is set to the first conveyance path and a second state where the moving direction of the medium is set to the second conveyance path, a solenoid that rotates the path switching member by a plunger configured to be displaced in a suction direction and a return direction opposite to the suction direction, and a link member that is a member provided in the path switching member and engages with the plunger, in which the link member includes a groove portion, the plunger includes a pin member that moves in the groove portion in association with the displacement operation, the solenoid regulates, in a suction state, a posture of the path switching member in the second state, a contact surface that is an inner surface of the groove portion and with which the pin member comes into contact when the plunger moves in the suction direction is formed in a non-linear shape to have a first region and a second region, the first region being a region in which the pin member is located when the path switching member is in the first state, and the second region being a region in which the pin member is located when the path switching member is in the second state, and a rotation angle of the path switching member with respect to a unit movement amount of the plunger when the pin member is located in the second region is smaller than that when the pin member is located in the first region.

In addition, a recording device of the present disclosure includes any one of the above-mentioned medium conveyance devices, and a recording unit configured to perform recording on a medium conveyed by the medium conveyance device.

DESCRIPTION OF EXEMPLARY EMBODIMENTS

Figure 1:
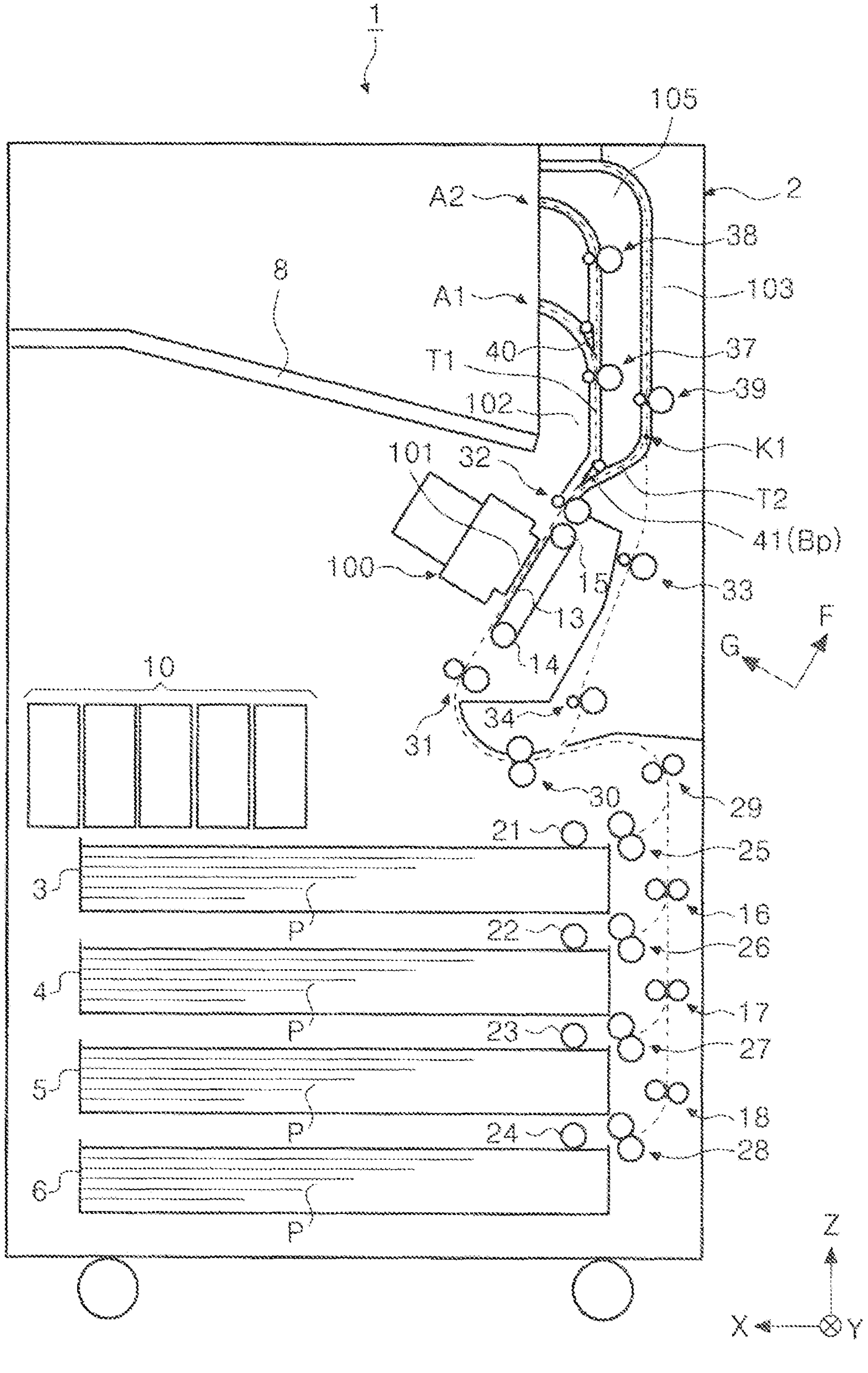
FIG. 1 is a diagram illustrating a medium conveyance path of a printer.

The present disclosure will be schematically described below.

A medium conveyance device according to a first aspect is a medium conveyance device including a branching portion where a conveyance path of a medium branches into a first conveyance path and a second conveyance path, a path switching member that is a member provided in the branching portion and rotates to switch between a first state where a moving direction of the medium is set to the first conveyance path and a second state where the moving direction of the medium is set to the second conveyance path, a solenoid that rotates the path switching member by a plunger configured to be displaced in a suction direction and a return direction opposite to the suction direction, and a link member that is a member provided in the path switching member and engages with the plunger, in which the link member includes a groove portion, the plunger includes a pin member that moves in the groove portion in association with the displacement operation, the solenoid, in a suction state, regulates a posture of the path switching member in the second state, a contact surface that is an inner surface of the groove portion and with which the pin member comes into contact when the plunger moves in the suction direction is formed in a non-linear shape to have a first region and a second region, the first region being a region extending in a first direction away from the center of rotation of the path switching member, and the second region being a region extending in a second direction away from the center of rotation and intersecting the first direction, and an angle formed by the suction direction and the second direction is smaller than an angle formed by the suction direction and the first direction.

According to this aspect, since the angle formed by the suction direction and the second direction is smaller than the angle formed by the suction direction and the first direction, the operation of the link member, that is, the path switching member, becomes slower when the pin member comes into contact with the second region than when the pin member comes into contact with the first region. Thereby, a variation in the posture of the path switching member when the plunger is suctioned is suppressed, and the posture of the path switching member in the second state can be made appropriate.

In contrast, since the angle between the suction direction and the first direction is larger than the angle between the suction direction and the second direction, the amount of operation of the link member, that is, the path switching member, is larger when the pin member comes into contact with the first region than when the pin member comes into contact with the second region. Thereby, it is possible to secure an amount of operation when the path switching member is operated by the solenoid, and thus it is possible to reliably perform switching of the conveyance path.

In a second aspect according to the first aspect, the angle formed by the suction direction and the second direction is an acute angle.

According to this aspect, since the angle formed by the suction direction and the second direction is an acute angle, it is possible to appropriately slow down the operation of the link member, that is, the path switching member, when the pin member is located in the second region, and it is possible to appropriately suppress a variation in the posture of the path switching member when the plunger is suctioned.

In a third aspect according to the first aspect, the angle formed by the suction direction and the first direction is 90° or an obtuse angle.

According to this aspect, since the angle formed by the suction direction and the first direction is 90° or an obtuse angle, it is possible to appropriately increase the amount of operation of the link member, that is, the path switching member, when the pin member is located in the first region.

Note that this aspect is not limited to the first aspect, and may be applied to the second aspect.

A medium conveyance device according to a fourth aspect is a medium conveyance device including a branching portion where a conveyance path of a medium branches into a first conveyance path and a second conveyance path, a path switching member that is a member provided in the branching portion and rotates to switch between a first state where a moving direction of the medium is set to the first conveyance path and a second state where the moving direction of the medium is set to the second conveyance path, a solenoid that rotates the path switching member by a plunger configured to be displaced in a suction direction and a return direction opposite to the suction direction, and a link member that is a member provided in the path switching member and engages with the plunger, in which the link member includes a groove portion, the plunger includes a pin member that moves in the groove portion in association with the displacement operation, the solenoid regulates, in a suction state, a posture of the path switching member in the second state, a contact surface that is an inner surface of the groove portion and with which the pin member comes into contact when the plunger moves in the suction direction is formed in a non-linear shape to have a first region and a second region, the first region being a region in which the pin member is located when the path switching member is in the first state, and the second region being a region in which the pin member is located when the path switching member is in the second state, and a rotation angle of the path switching member with respect to a unit movement amount of the plunger when the pin member is located in the second region is smaller than that when the pin member is located in the first region.

According to this aspect, since the rotation angle of the path switching member with respect to the unit movement amount of the plunger is smaller when the pin member comes into contact with the second region than when the pin member comes into contact with the first region, the operation of the path switching member becomes slower when the pin member comes into contact with the second region than when the pin member comes into contact with the first region. Thereby, a variation in the posture of the path switching member when the plunger is suctioned is suppressed, and the posture of the path switching member in the second state can be made appropriate.

In contrast, since the rotation angle is larger when the pin member comes into contact with the first region than when the pin member comes into contact with the second region, an amount of operation when the path switching member is operated by the solenoid is larger when the pin member is located in the first region than when the pin member is located in the second region. Thereby, it is possible to secure the amount of operation of the path switching member and reliably perform the switching of the conveyance path.

In a fifth aspect according to the fourth aspect, the medium conveyance device further includes a first path forming member that forms the conveyance path, and a posture of the path switching member in the first state is regulated when the path switching member abuts on the first path forming member in a state where the solenoid is returned.

According to this aspect, since the posture of the path switching member in the first state is regulated when the path switching member abuts on the first path forming member in the return state of the solenoid, it is possible to appropriately regulate the posture of the path switching member in the first state.

Note that this aspect is not limited to the fourth aspect, and may be applied to any one of the first to third aspects.

In a sixth aspect according to the fifth aspect, the medium conveyance device further includes a pressing member that presses the path switching member in a direction in which the path switching member abuts on the first path forming member. According to this aspect, since the path switching member includes the pressing member that presses the path switching member in a direction in which the path switching member abuts on the first path forming member, the posture of the path switching member in the first state is stabilized.

Note that this aspect is not limited to the fifth aspect, and may be applied to any one of the first to fourth aspects.

In a seventh aspect according to the fifth aspect, the center of rotation of the path switching member is closer to the first path forming member than to the pin member when viewed from a medium width direction intersecting a medium conveyance direction.

According to this aspect, in a configuration in which the center of rotation of the path switching member is closer to the path forming member than to the pin member when viewed from the medium width direction intersecting the medium conveyance direction, operational effects of the sixth aspect described above are obtained.

Note that this aspect is not limited to the fifth aspect and may be applied to any one of the first to fourth and sixth aspects.

In an eighth aspect according to the fifth aspect, the medium conveyance device further includes a second path forming member that forms the conveyance path at a position facing the first path forming member, the second path forming member is provided with a detection unit for detecting the medium, and the path switching member forms a gap between the path switching member and the second path forming member in the second state.

According to this aspect, since the second path forming member is provided with the detection unit for detecting the medium, and the path switching member forms a gap between the path switching member and the second path forming member in the second state, it is possible to suppress the occurrence of noise or the occurrence of adverse effects on the detection unit due to the path switching member abutting on the second path forming member.

Note that this aspect is not limited to the fifth aspect and may be applied to any one of the first to fourth, sixth, and seventh aspects.

In a ninth aspect according to the fifth aspect, the medium conveyance device further includes a second path forming member that forms the conveyance path at a position facing the first path forming member, and the second path forming member is provided with a concave portion into which a tip of the path switching member enters when the path switching member is in the second state.

According to this aspect, since the second path forming member is provided with the concave portion into which the tip of the path switching member enters when the path switching member is in the second state, it is possible to prevent the medium from being caught by the tip when the medium passes through the tip of the path switching member.

Note that this aspect is not limited to the fifth aspect, and may be applied to any one of the first to fourth aspects and the sixth to eighth aspects.

In a tenth aspect according to the first aspect, a device main body including the conveyance path includes a first unit that is configured to open and close and a second unit that is configured to open and close inside the first unit, the second conveyance path is exposed by opening the first unit, and the first conveyance path is exposed by opening the second unit.

According to this aspect, since the second conveyance path is exposed by opening the first unit and the first conveyance path is exposed by opening the second unit, it is possible to easily remove the medium which is jammed when jamming of the medium has occurred in the first conveyance path and the second conveyance path.

Note that this aspect is not limited to the first aspect and may be applied to any one of the second to ninth aspects.

A recording device according to an eleventh aspect includes the medium conveyance device according to any one of the first to tenth aspects, and a recording unit configured to perform recording on the medium conveyed by the medium conveyance device.

According to this aspect, operational effects of any one of the first to tenth aspects described above are obtained in the recording device.

In a twelfth aspect according to the eleventh aspect, the first conveyance path is a path for discharging the medium on which recording was performed by the recording unit, and the second conveyance path is a path for reversing front and back sides of the medium on which recording was performed by the recording unit.

According to this aspect, in a configuration in which the first conveyance path is a path for discharging the medium on which recording was performed by the recording unit, and the second conveyance path is a path for reversing front and back sides of the medium on which recording was performed by the recording unit, operational effects of any of the first to tenth aspects described above are obtained.

The present disclosure will be specifically described below.

Hereinafter, an ink jet printer 1 configured to perform recording by discharging ink, which is an example of a liquid, onto a medium represented by recording paper will be described as an example of a recording device. Hereinafter, the inkjet printer 1 is simply referred to as a printer 1. The printer 1 can also be regarded as a medium conveyance device from the viewpoint of conveying a medium. From the viewpoint of the medium conveyance device, a line head 101, which is an example of a recording unit to be described below, may not be provided.

An X-Y-Z coordinate system illustrated in each drawing is an orthogonal coordinate system in which a Y-axis direction is a medium width direction intersecting a conveyance direction of a medium and is a device depth direction. In the Y-axis direction, a +Y direction, which is a direction indicated by an arrow, is a direction from the front surface of the device toward the rear surface of the device, and a −Y direction opposite to the +Y direction in the Y-axis direction is a direction from the rear surface of the device toward the front surface of the device.

In addition, an X-axis direction is a device width direction, and the +X direction, which is a direction indicated by an arrow when viewed from an operator of the printer 1, represents a left side, and an −X direction opposite to the +X direction represents a right side. A Z-axis direction is a vertical direction, that is, a device height direction, a +Z direction which is a direction indicated by an arrow is an upward direction, and a −Z direction opposite to the +Z direction is a downward direction. Hereinafter, unless otherwise specified, "upper" refers to the +Z direction, and "lower" refers to the −Z direction.

In addition, a G-axis direction is a moving direction of a head unit 100 to be described below, a +G direction which is a direction indicated by an arrow is a direction in which the head unit 100 separates from a conveyance belt 13, and a −G direction which is opposite to the +G direction is a direction in which the head unit 100 approaches the conveyance belt 13.

In addition, an F-axis direction is a direction parallel to a belt surface of the conveyance belt 13 and is a medium conveyance direction at a position facing a line head 101 to be described below, a +F direction which is a direction indicated by an arrow is a downstream direction of the conveyance direction, and a −F direction opposite to the +F direction is an upstream direction of the conveyance direction. Note that, hereinafter, a direction in which a medium is conveyed may be referred to as "downstream", and a direction opposite thereto may be referred to as "upstream".

In FIG. 1, a medium conveyance path is indicated by a dashed line. In the printer 1, a medium is conveyed through the medium conveyance path indicated by a dashed line.

The printer 1 includes a plurality of medium cassettes in a vertical direction in a lower portion of a device main body 2. In the present embodiment, the printer 1 includes the medium cassettes, that is, a second medium cassette 4, a third medium cassette 5, and a fourth medium cassette 6, in this order from an uppermost first medium cassette 3 in a downward direction. Sign P denotes a medium accommodated in each medium cassette.

Each medium cassette is provided with a pick roller that sends out the accommodated medium. The pick rollers are denoted by signs 21, 22, 23, and 24.

In addition, each of the medium cassettes is provided with a feed roller pair that feeds a sent-out medium upward in an oblique upward direction. The feed roller pairs are denoted by signs 25, 26, 27, and 28. In addition, each of the second medium cassette 4, the third medium cassette 5, and the fourth medium cassette 6 is provided with a conveyance roller pair that conveys a medium upward. The conveyance roller pairs are denoted by signs 16, 17, and 18.

Note that, in the following description, unless otherwise specified, it is assumed that a "roller pair" is constituted by a driving roller driven by a motor which is not illustrated in the drawing, and a driven roller that is driven to rotate while being in contact with the driving roller.

The medium sent out from each medium cassette reaches a conveyance roller pair 29 and is further sent to a conveyance roller pair 30 on a downstream side by the conveyance roller pair 29. A medium conveyance path on the downstream side from the conveyance roller pair 29 is curved to be convex upward, and a medium reaches the conveyance roller pair 30 through the curved path portion. The medium that receives a feeding force from the conveyance roller pair 30 is sent to a conveyance roller pair 31 through a curved path that is curved to be convex downward.

The medium that receives a feeding force from the conveyance roller pair 31 is sent between the line head 101, which is an example of a recording unit, and the conveyance belt 13, that is, to a position facing the line head 101. The line head 101 performs recording by ejecting ink, which is a liquid, onto the surface of the medium. The line head 101 is an ink ejection head configured such that nozzles (not illustrated) for ejecting ink cover the entire region in the medium width direction, and is configured as an ink ejection head capable of recording on the entire region of the medium width without moving in the medium width direction.

The head unit 100 including the line head 101 is provided to be movable in the G-axis direction by a driving source which is not illustrated in the drawing.

Reference numeral 10 denotes an ink accommodation portion for storing ink. Ink ejected from the line head 101 is supplied from the ink accommodation portion 10 to the line head 101 through a tube which is not illustrated in the drawing. The ink accommodation portion 10 is constituted by a plurality of ink tanks disposed in the X-axis direction.

The conveyance belt 13 is an endless belt wound around a pulley 14 and a pulley 15, and rotates when at least one of the pulley 14 and the pulley 15 is driven by a motor which is not illustrated in the drawing. A medium is conveyed to a position facing the line head 101 while being adsorbed to a belt surface of the conveyance belt 13. A known adsorption method such as an air suction method or an electrostatic adsorption method can be adopted to adsorb a medium to the conveyance belt 13.

Here, a medium conveyance path passing through the position facing the line head 101 intersects both the horizontal direction and the vertical direction, and is configured to convey the medium upward in an oblique direction. Such an oblique upward conveyance direction is a direction including a −X direction component and a +Z direction component in FIG. 1, and the horizontal dimension of the printer 1 can be suppressed with such a configuration.

Note that, in the present embodiment, the medium conveyance path passing through the position facing the line head 101 is set at an inclination angle in a range of 50 degrees to 70 degrees with respect to the horizontal direction, and more specifically, is set at an inclination angle of 60 degrees.

A medium having a first surface on which recording is performed by the line head 101 is further sent upward by a conveyance roller pair 32 positioned downstream of the conveyance belt 13.

A downstream medium conveyance path branches into a discharge path T1 which is an example of a "first conveyance path" and a reverse path T2 which is an example of a "second conveyance path" from the conveyance roller pair 32. A branching portion Bp at which the two medium conveyance paths are branched is provided with an upstream flap 41 which is an example of a "path switching member", and a moving direction of a medium is switched by the upstream flap 41. The upstream flap 41 rotates to switch between a first state where a medium moving direction is set to the discharge path T1 and a second state where the medium moving direction is set to the reverse path T2.

When the media on which recording was performed is discharged as it is, a medium moving direction from the branching portion Bp is set to the discharge path T1, and the media is sent to the conveyance roller pair 37. A downstream flap 40 is further provided downstream of the conveyance roller pair 37, and a conveyance path is switched to either discharge from a discharge port A1 or conveyance to the conveyance roller pair 38 positioned further vertically above by the downstream flap 40. When the medium is sent toward the conveyance roller pair 38, the medium is discharged from a discharge port A2.

The medium discharged from the discharge port A1 is received by a discharge tray 8. The medium discharged from the discharge port A2 is received by an option tray which is not illustrated in the drawing.

Note that, in the present embodiment, the discharge path T1 is a medium conveyance path between the branching portion Bp and the conveyance roller pair 37. However, the discharge path T1 is not limited thereto, and may include a medium conveyance path further downstream from the conveyance roller pair 37.

The discharge path T1 is formed between a second unit 105 and a main body unit 102 which are to be described below.

When recording is performed on a second surface in addition to the first surface of the medium, the medium moving direction from the branching portion Bp is set to the reverse path T2. Thereby, the medium passes through a branching position K1 and is sent from the branching position K1 to an upper switch-back path. The switch-back path is provided with a conveyance roller pair 39, the medium entering the switch-back path is conveyed upward by the conveyance roller pair 39, and when a trailing end of the medium passes through the branching position K1, the rotation direction of the conveyance roller pair 39 is switched, whereby the medium is conveyed downward.

Note that, in the present embodiment, the reverse path T2 is a medium conveyance path between the branching portion Bp and the conveyance roller pair 39. However, the reverse path T2 is not limited thereto, and may include a medium conveyance path further downstream from the conveyance roller pair 39.

The reverse path T2 is formed between a second unit 105 and a first unit 103 which are to be described below.

The medium conveyed downward by the conveyance roller pair 39 receives a feeding force from a conveyance roller pair 33 and a conveyance roller pair 34, reaches the conveyance roller pair 30, and is sent again to the position facing the line head 101 by the conveyance roller pair 30.

In the medium sent to the position facing the line head 101 again, the second surface on a side opposite to the first surface on which recording has already been performed faces the line head 101. Thereby, the line head 101 can perform recording on the second surface of the medium.

Next, the upstream flap 41 will be further described with reference to FIG. 2 and the subsequent drawings.

Figure 2:
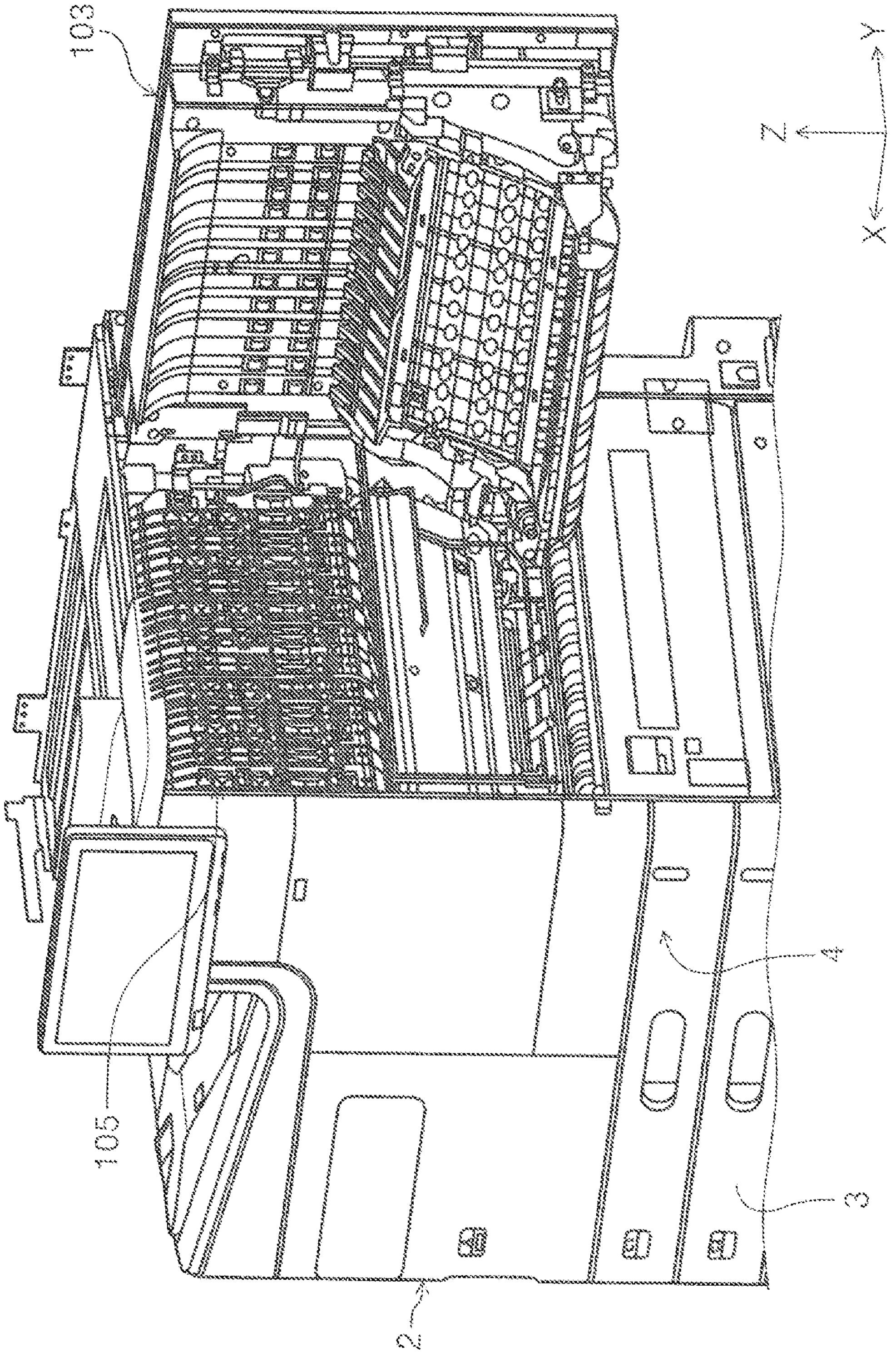
FIG. 2 is a perspective view illustrating a state where a right door unit of a device main body is opened.

As illustrated in FIG. 2, the first unit 103, which is openable and closable, is provided on a side surface of the device main body 2 in the −X direction, that is, on a right side surface. By opening the first unit 103, the second unit 105 is exposed, that is, the reverse path T2 (see FIG. 1) is exposed.

Figure 3:
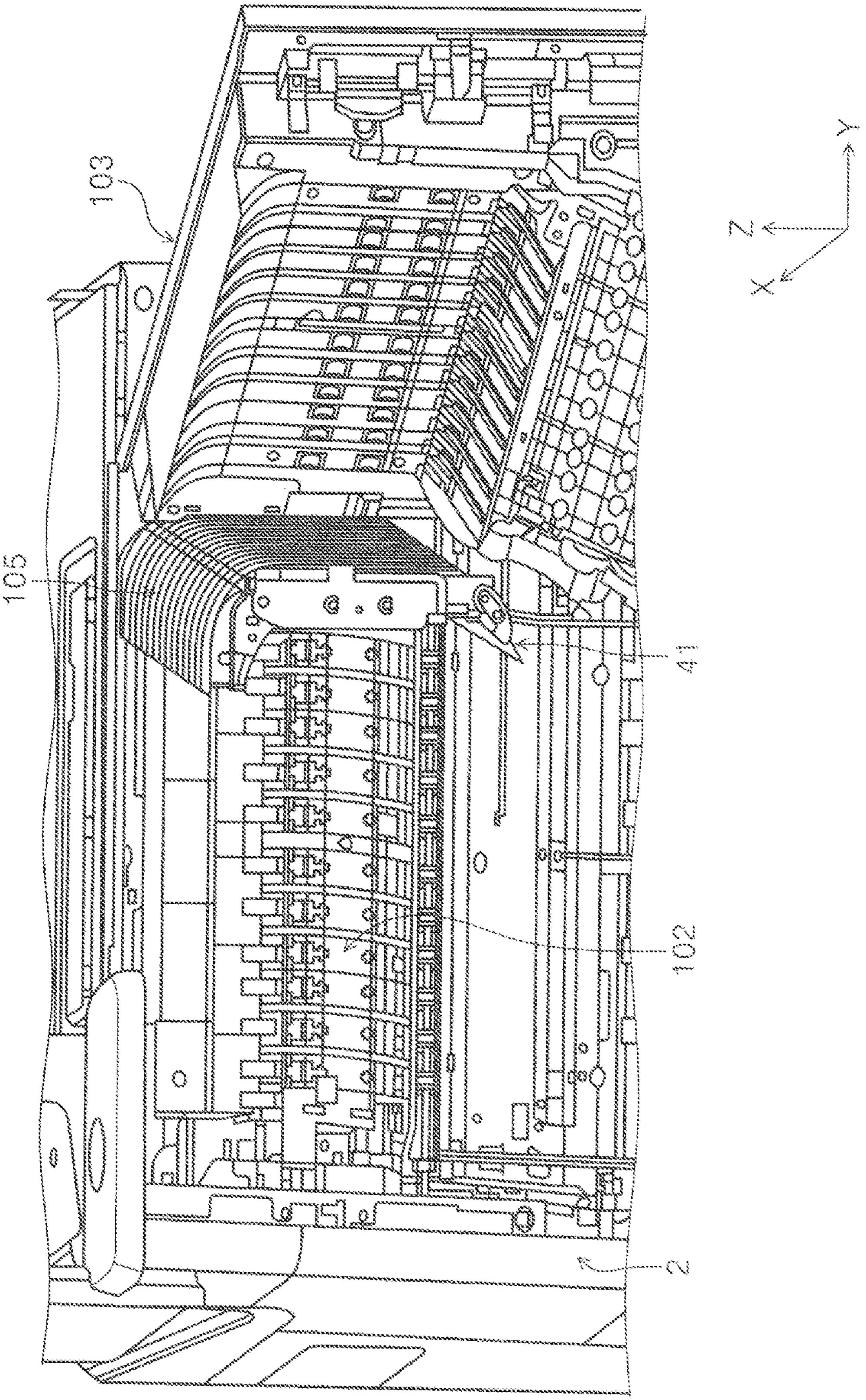
FIG. 3 is a perspective view illustrating a state where the right door unit of the device main body is opened, and a middle door unit is further opened.

In addition, the second unit 105, which is openable and closable, is further provided inside the first unit 103. As illustrated in FIG. 3, by opening the second unit 105, the main body unit 102 is exposed, that is, the discharge path T1 (see FIG. 1) is exposed.

As described above, in such a configuration, the reverse path T2 is exposed by opening the first unit 103, and the discharge path T1 is exposed by opening the second unit 105, and thus it is possible to easily remove the medium which is jammed when jamming of the medium has occurred in the discharge path T1 and the reverse path T2.

The upstream flap 41 is provided at a lower portion of the second unit 105 and constitutes a lower end portion of the second unit 105.

Figure 4:
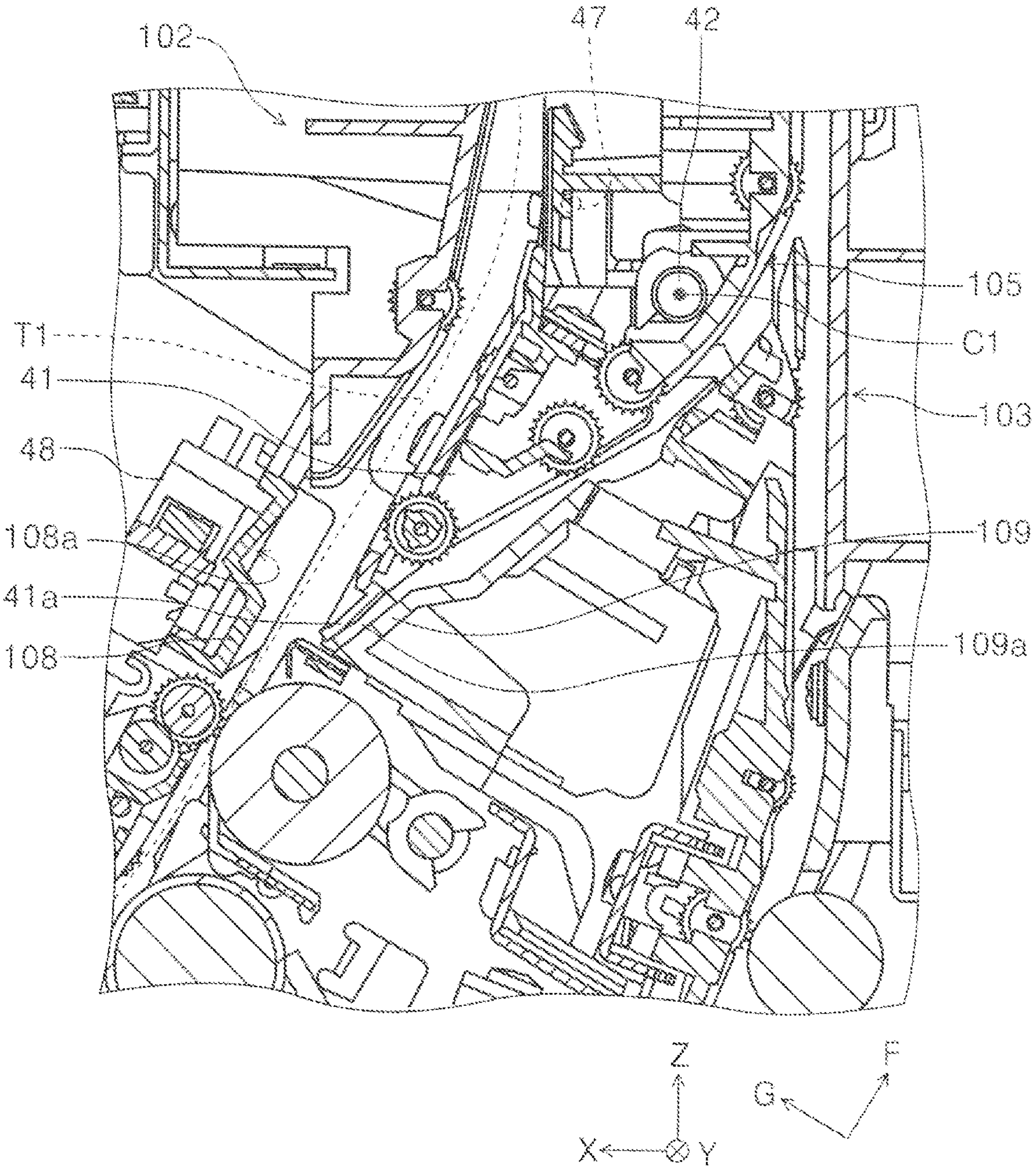
FIG. 4 is a diagram illustrating a medium conveyance path in the vicinity of an upstream flap when the upstream flap is in a first state.
Figure 5:
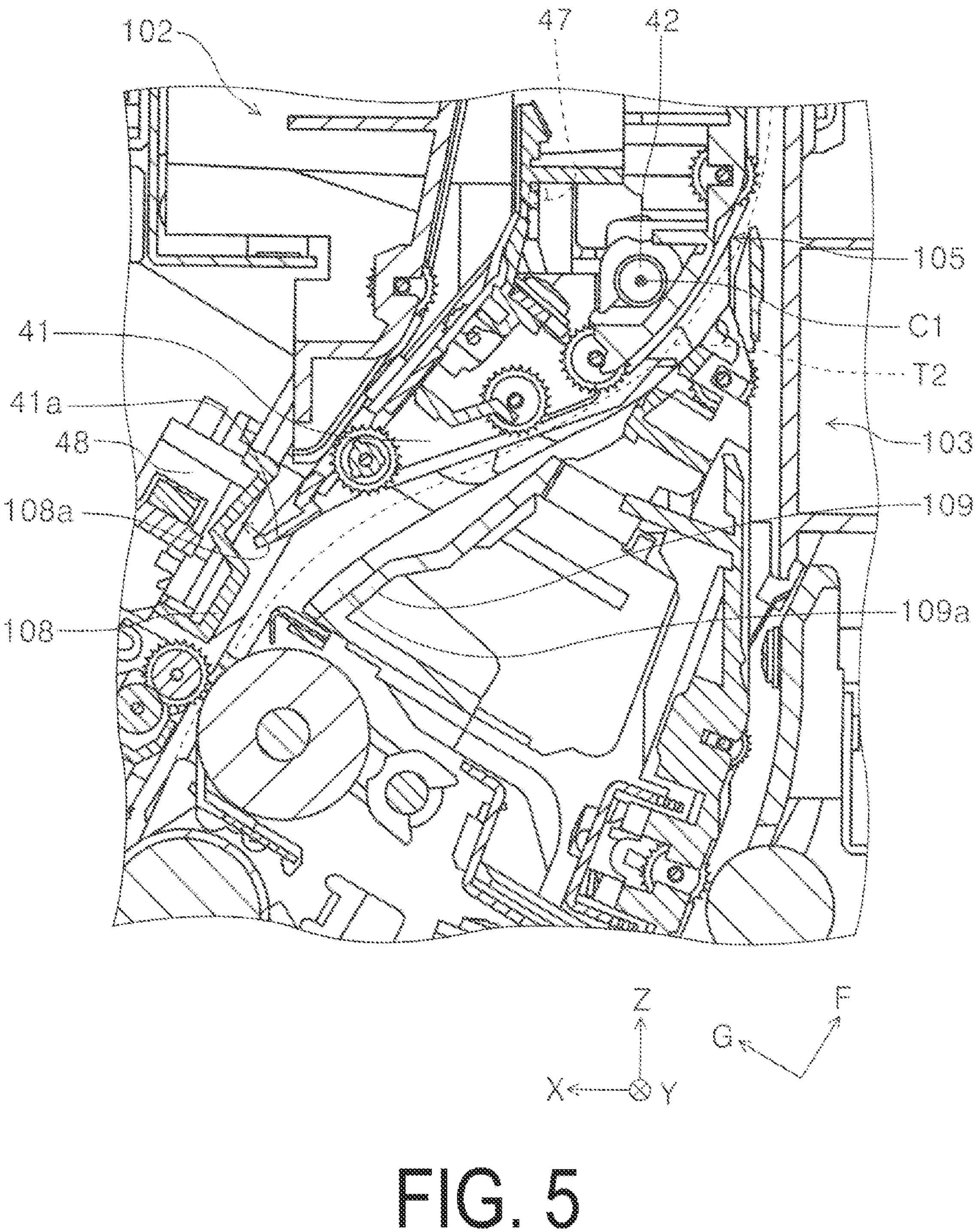
FIG. 5 is a diagram illustrating the medium conveyance path in the vicinity of the upstream flap when the upstream flap is in a second state.

In FIGS. 4 and 5, reference numeral 42 denotes a rotation shaft of the upstream flap 42. Further, in FIGS. 4 and 5, reference numeral 108 denotes a second path forming member constituting the main body unit 102, and a concave portion 108*a* is formed in the second path forming member 108. The second path forming member 108 is provided with a detection unit 48 for detecting the passage of the medium.

Further, in FIGS. 4 and 5, reference numeral 109 denotes a first path forming member constituting the first unit 103, and an abutting portion 109*a* is formed in the first path forming member 109.

FIG. 4 illustrates a first state of the upstream flap 41, that is, a state where the medium moving direction is set to the discharge path T1. In the first state, a tip portion 41*a* of the upstream flap 41 abuts on the abutting portion 109*a* by a spring force of a coil spring 44 (see FIG. 6) which is to be described below, and thus the posture of the upstream flap 41 in the first state is regulated.

In addition, FIG. 5 illustrates a second state of the upstream flap 41, that is, a state where the medium moving direction is set to the reverse path T2. In the second state, the upstream flap 41 takes a posture in which the tip portion 41*a* enters the concave portion 108*a*, and the posture of the upstream flap 41 is regulated by the suction of a solenoid 45 to be described below.

Figure 6:
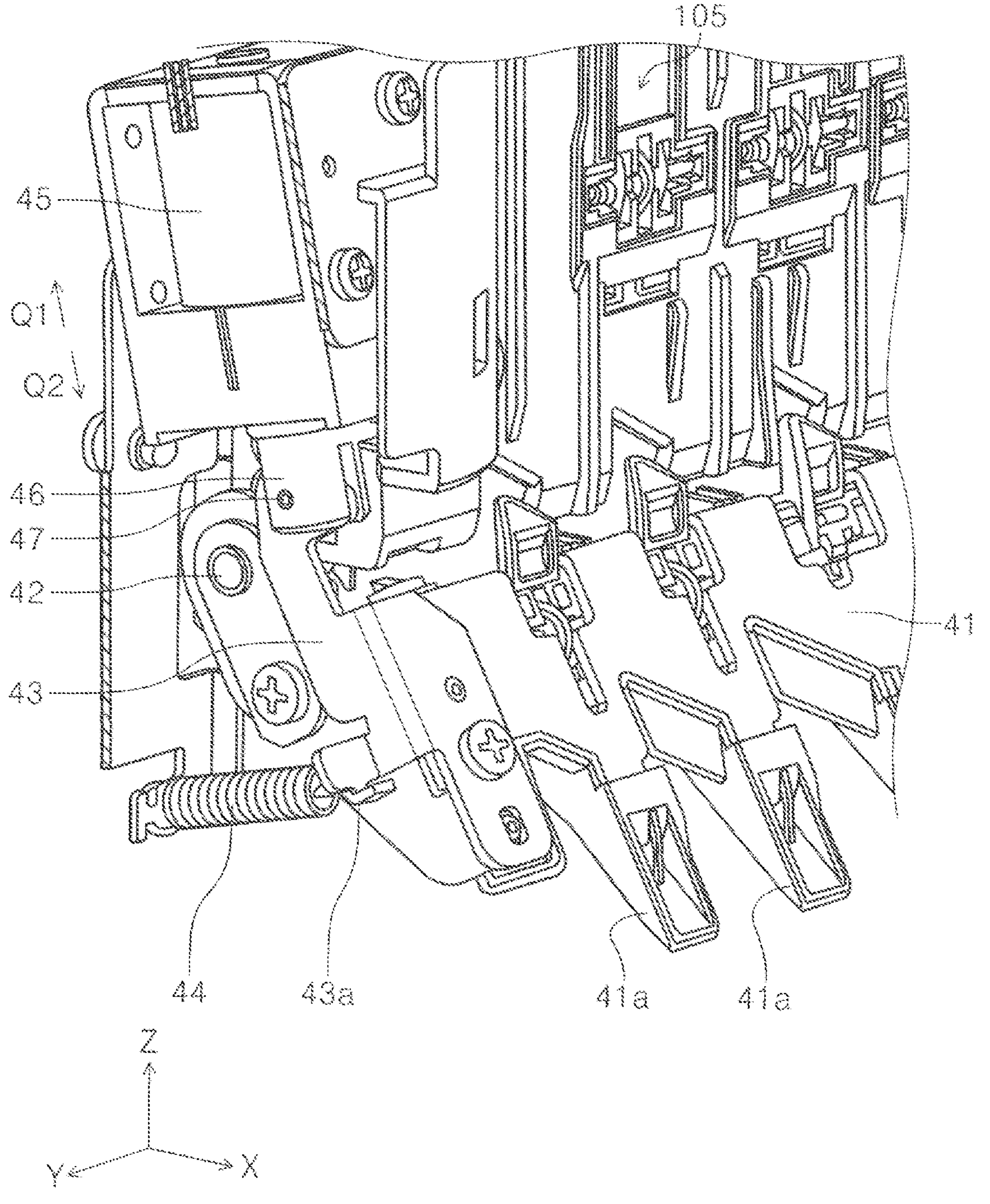
FIG. 6 is a perspective view of the upstream flap and a solenoid when the upstream flap is in the first state.
Figure 7:
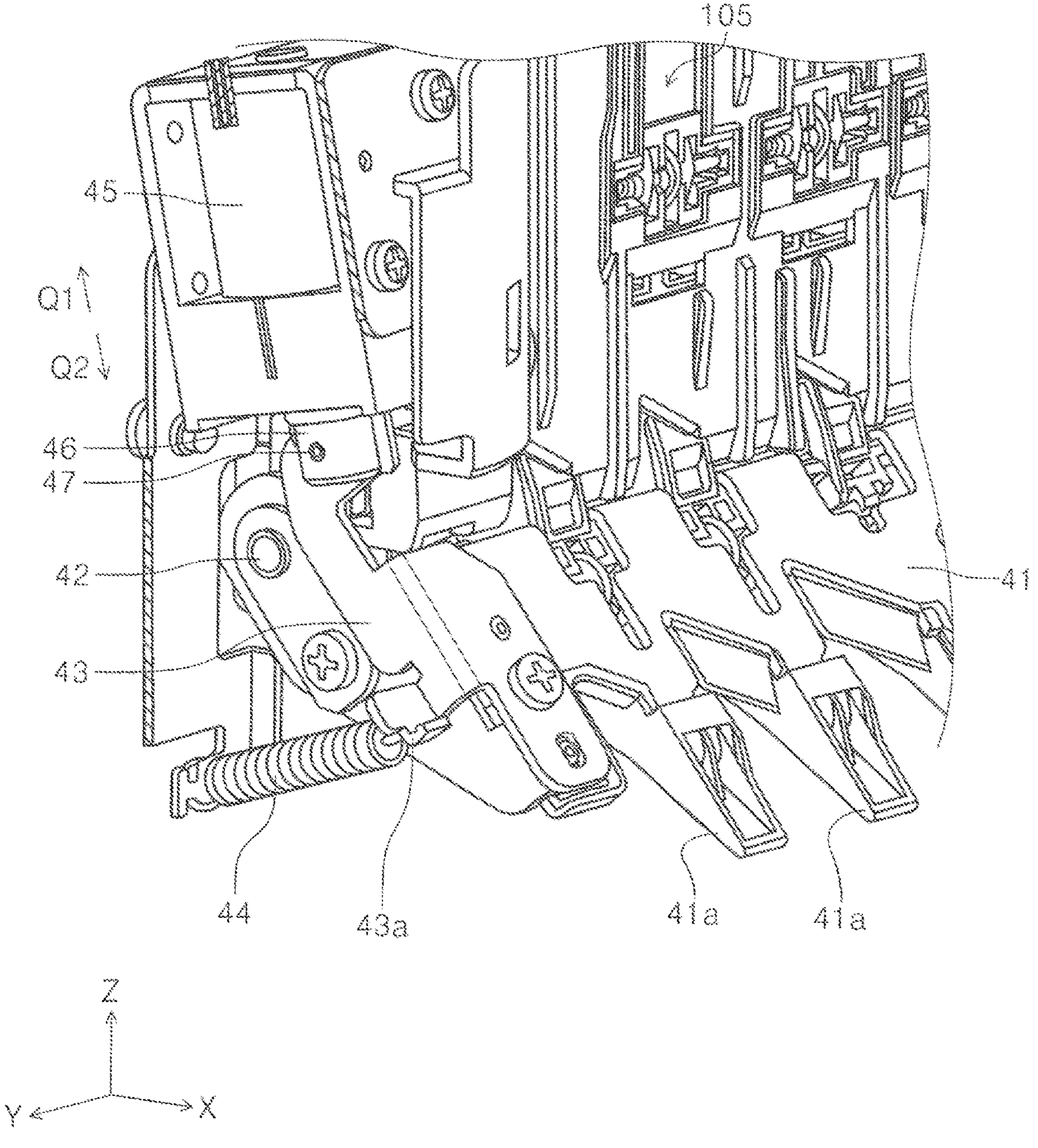
FIG. 7 is a perspective view of the upstream flap and the solenoid when the upstream flap is in the second state.

As illustrated in FIGS. 6 and 7, a link member 43 is provided at the end of the upstream flap 41 in the +Y direction. A spring hook portion 43*a* is formed in the link member 43, and the coil spring 44 which is an example of a pressing member is hooked on the spring hook portion 43*a*. In addition, the link member 43, that is, the upstream flap 41 is pressed in a direction toward the first state by the coil spring 44.

The solenoid 45 is provided at an upper portion of the link member 43. The solenoid 45 includes a plunger 46 which is displaced in a suction direction Q1 and a return direction Q2. Hereinafter, a state where the plunger 46 is most displaced in the suction direction Q1 in the stroke range of the plunger 46 may be referred to as a suction state of the solenoid 45, and a state where the plunger 46 is most displaced in the return direction Q2 may be referred to as a return state of the solenoid 45.

Figure 8:
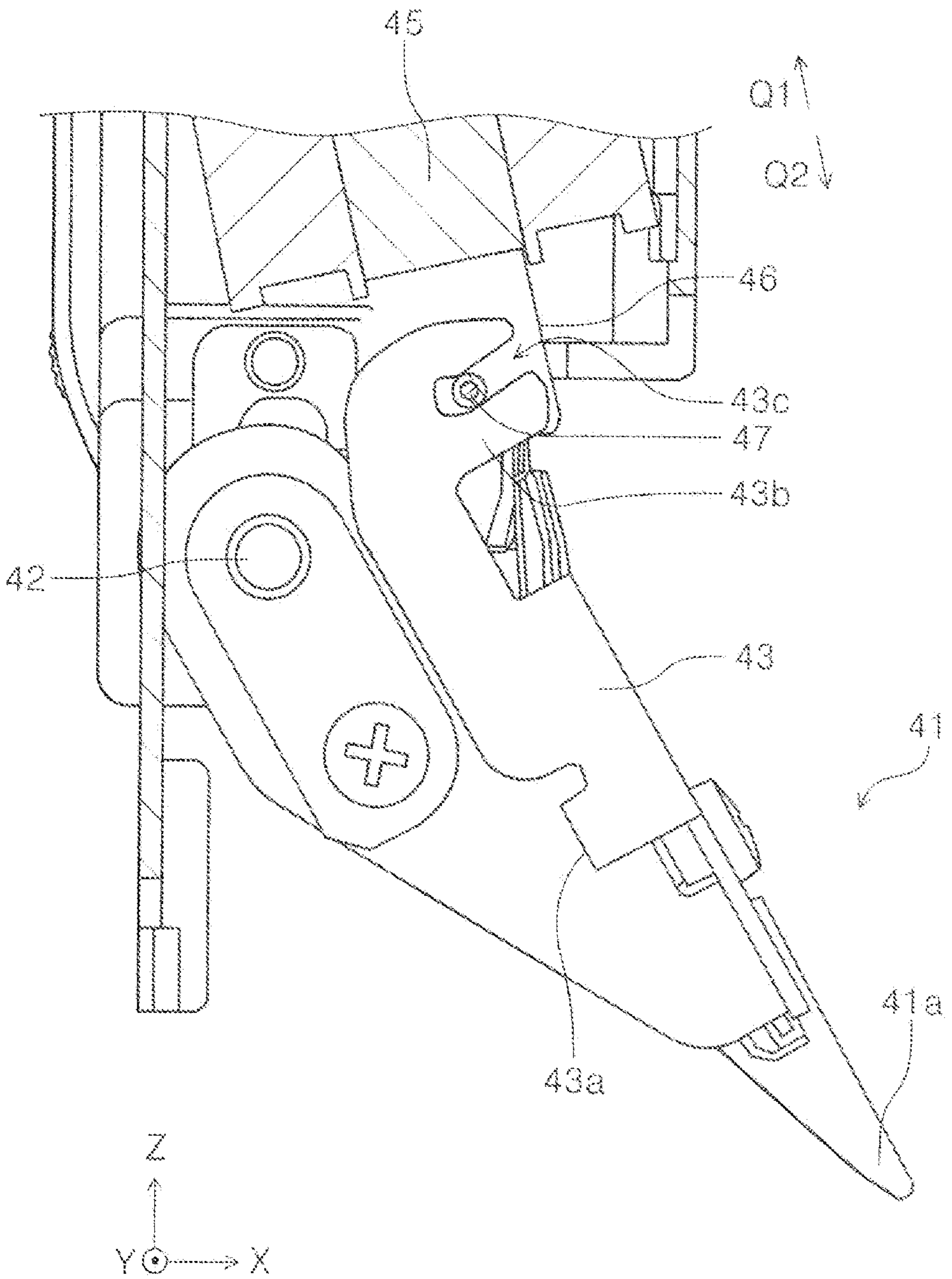
FIG. 8 is a side view of the upstream flap when the upstream flap is in the first state.
Figure 9:
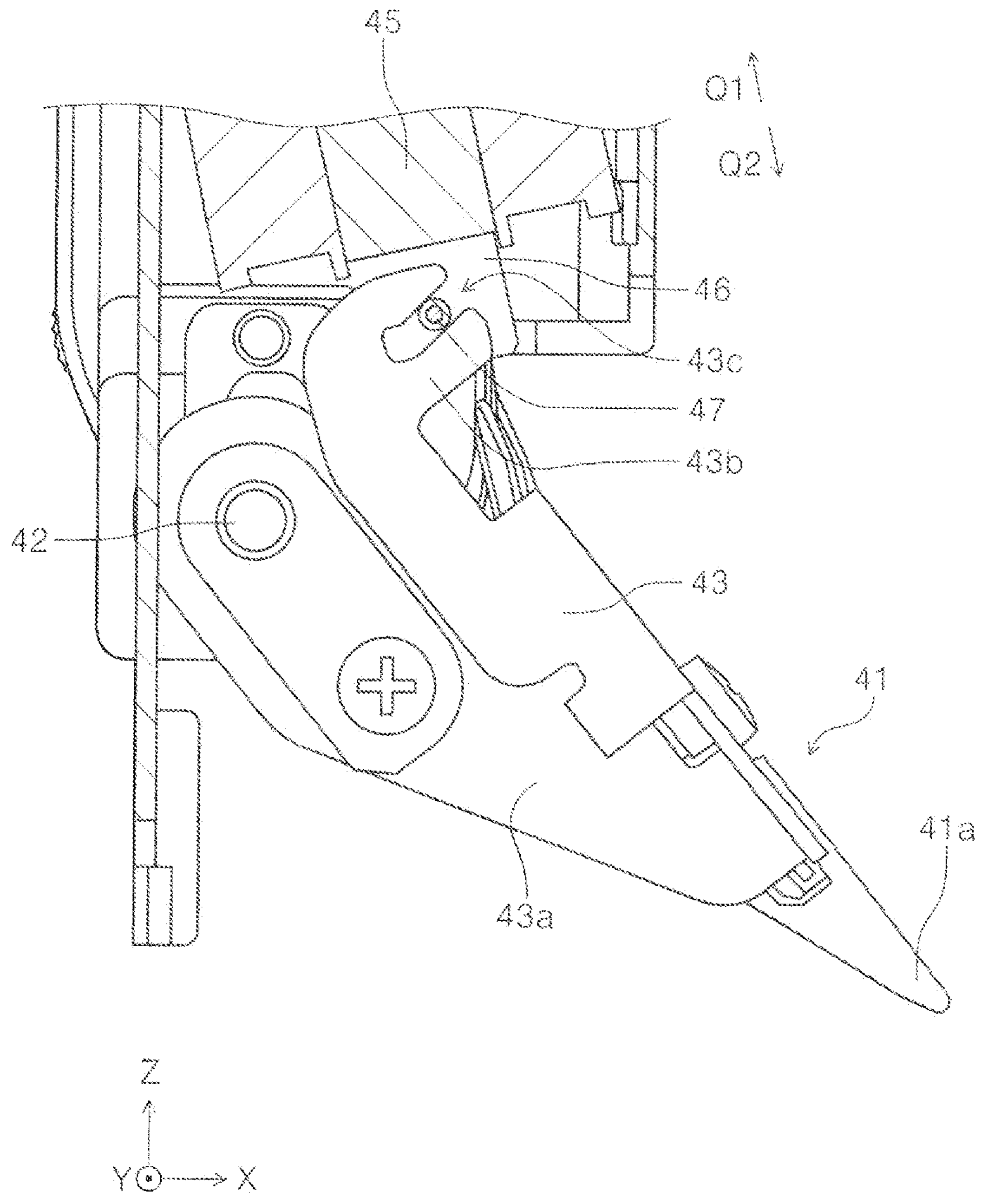
FIG. 9 is a side view of the upstream flap when the upstream flap is in the second state.

A pin member 47 is provided in the plunger 46 and enters a groove portion 43*c* formed in the link member 43 as illustrated in FIGS. 8 and 9. The groove portion 43*c* is formed in a groove forming portion 43*b* of the link member 43.

With such a configuration, the plunger 46 engages with the upstream flap 41 through the link member 43, and when the plunger 46 is displaced in the suction direction Q1, the upstream flap 41 rotates in the counterclockwise direction in FIGS. 8 and 9.

In the present embodiment, the solenoid 45 is a so-called self-holding type solenoid, the solenoid 45 is set to be in a return state during non-electrification, and the plunger 46 is separated from the main body of the solenoid 45 due to a spring force of the coil spring 44, whereby the upstream flap 41 is maintained in the first state (the state illustrated in FIGS. 6 and 8). When the solenoid 45 is set to be in a first electrification state from this state, the plunger 46 is suctioned and displaced in the suction direction Q1, and the solenoid 45 is set to be in a suction state, whereby the upstream flap 41 is switched from the first state to the second state (the state illustrated in FIGS. 7 and 9). Note that, even when the first electrification state is canceled in the suction state of the solenoid 45, and a non-electrification state is set, the suction state of the solenoid 45 is maintained by a permanent magnet, not illustrated in the drawing, which is included in the main body of the solenoid 45. In addition, when the solenoid 45 is set to be in a second electrification state in the suction state of the solenoid 45, the magnetic field of the permanent magnet is canceled out, and the plunger 46 is displaced in the return direction Q2 due to the spring force of the coil springs 44, whereby the upstream flap 41 is switched from the second state to the first state. Note that the solenoid 45 is not limited to a self-holding type, and may be any of other types as long as the second state of the upstream flap 41 is formed in the suction state of the solenoid 45.

As described above, the solenoid 45 regulates the posture of the upstream flap 41 set to be in the second state in the suction state, and thus the position of the plunger 46 in the suction state is important. When the position of the plunger 46 in the suction state is shifted, for example, the tip portion 41*a* of the upstream flap 41 may come out downward from the concave portion 108*a* of the second path forming member 108 illustrated in FIG. 5, and thus there is a concern that the medium may be caught by the tip portion 41*a*. In addition, when the tip portion 41*a* abuts on the second path forming member 108, noise may be generated, the tip portion 41*a* or the second path forming member 108 may be damaged, or the detection accuracy of the detection unit 48 provided in the second path forming member 108 may be reduced. This is a first problem when the upstream flap 41 is driven by the solenoid 45.

Figure 12:
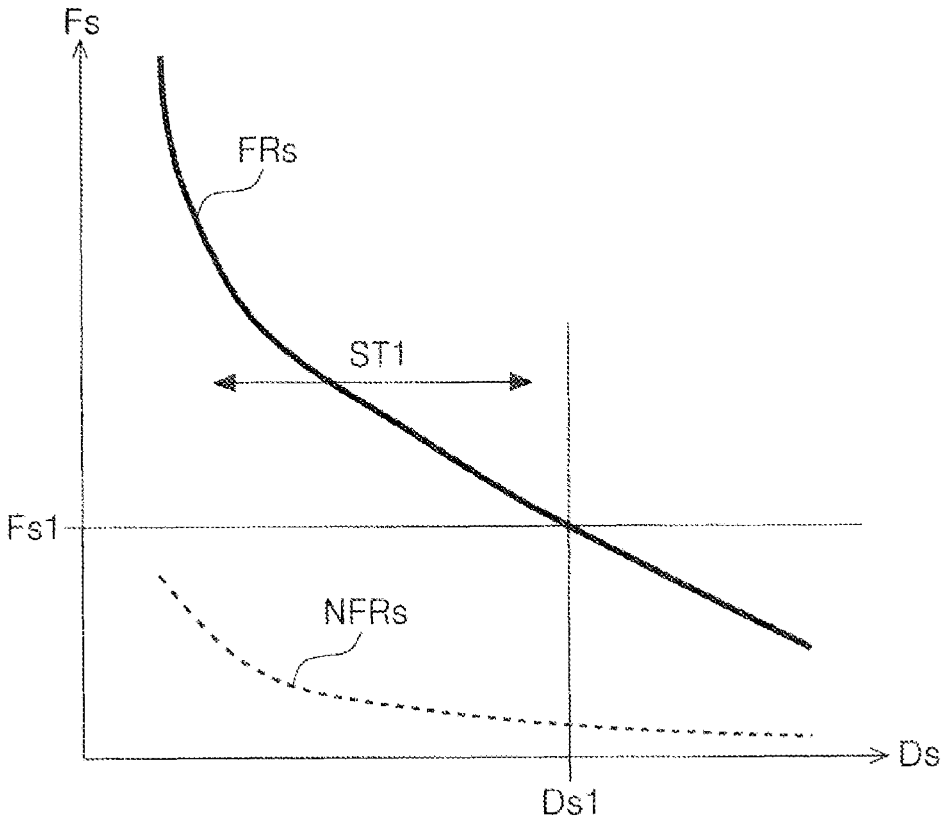
FIG. 12 is a graph illustrating a relationship between a stroke of a plunger and a suction force in the solenoid.

In addition, since the suction force of the solenoid 45 decreases as the plunger 46 separates from the main body of the solenoid 45, it is necessary to reliably switch the posture of the upstream flap 41 with a limited stroke of the plunger 46. In FIG. 12, the vertical axis represents a suction force Fs of the solenoid 45, and the horizontal axis represents a distance Ds of the plunger 46 from the solenoid 45. A curve indicated by sign FRs indicates a suction force of the solenoid 45, and as illustrated in the drawing, the longer the distance Ds, the lower the suction force Fs. The suction force Fs1 is a minimum suction force required to switch the upstream flap 41 from the first state to the second state against the spring force of the coil spring 44, and the stroke of the plunger 46 is limited to a range indicated by sing ST1 as an example. Thus, the upstream flap 41 has to be rotated with such a limited stroke of the plunger 46. This is a second problem when the upstream flap 41 is driven by the solenoid 45.

In the present embodiment, in order to cope with the first and second problems described above, the groove portion 43*c* formed in the link member 43 has the following characteristics.

Figure 10:
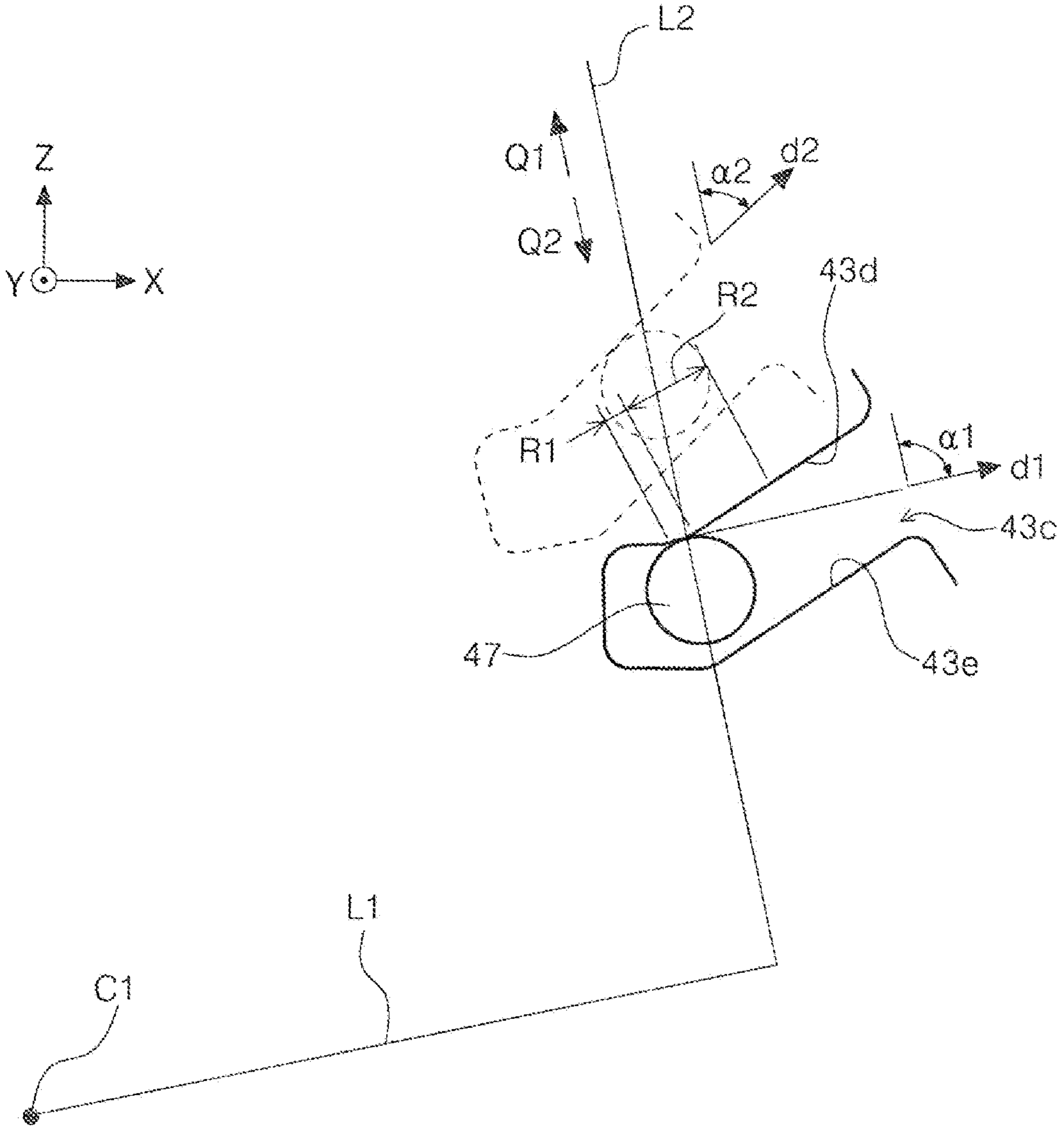
FIG. 10 is a partially enlarged view of a lever when the upstream flap is in the first state.
Figure 11:
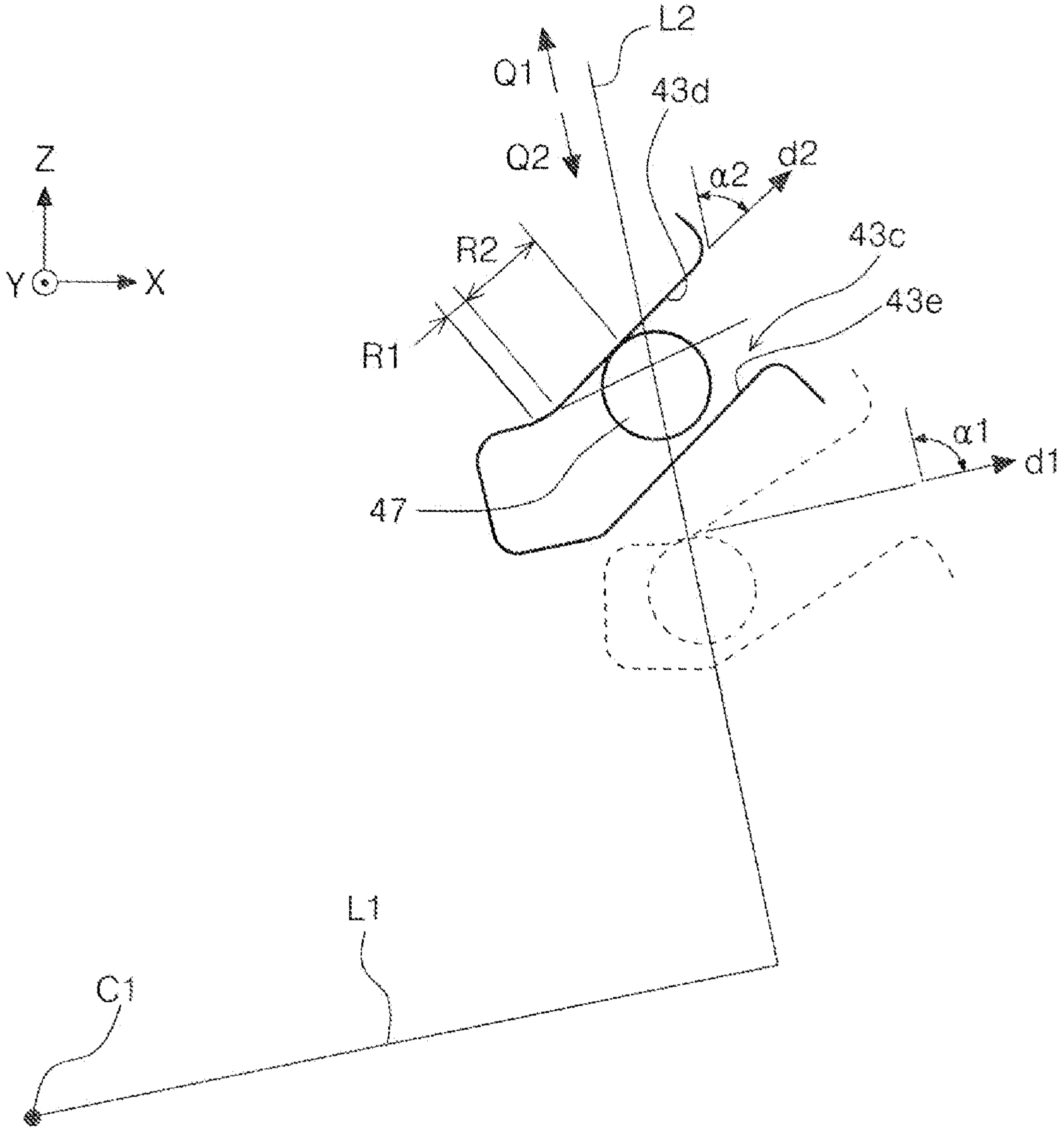
FIG. 11 is a partially enlarged view of the lever when the upstream flap is in the second state.

In FIGS. 10 and 11, sign Cl denotes the axial center position of the rotation shaft 42, sign L2 denotes a straight line passing through the center position of the pin member 47 and parallel to the stroke direction of the plunger 46, and sign L1 denotes a straight line passing through the axial center position Cl and perpendicular to the straight line L2. In FIG. 10, a positional relationship between the groove portion 43*c* and the pin member 47 when the upstream flap 41 is in the first state is indicated by a solid line. Note that a dashed line in FIG. 10 indicates a positional relationship between the groove portion 43*c* and the pin member 47 when the upstream flap 41 is in the second state for reference.

In FIG. 11, a positional relationship between the groove portion 43*c* and the pin member 47 when the upstream flap 41 is in the second state is indicated by a solid line. Note that a dashed line in FIG. 11 indicates a positional relationship between the groove portion 43*c* and the pin member 47 when the upstream flap 41 is in the first state for reference.

The inner surface of the groove portion 43*c* is constituted by a first contact surface 43*d* on an upper side and a second contact surface 43*e* on a lower surface. The pin member 47 relatively moves in the groove portion 43*c* while being in contact with the first contact surface 43*d* by a suction operation of the solenoid 45. The moving direction of the pin member 47 at this time is a direction in which the pin member 47 comes out of the groove portion 43*c*. That is, the first contact surface 43*d* is a contact surface with which the pin member 47 comes into contact when the plunger 46 moves in the suction direction Q1. Note that the first contact surface 43*d* is also a surface with which the pin member 47 comes into contact when the link member 43 is pulled in the clockwise direction in FIGS. 10 and 11 due to the spring force of the coil spring 44.

The first contact surface 43*d* is formed in a non-linear shape to have a first region R1 where the pin member 47 is positioned when the upstream flap 41 is in the first state, and a second region R2 where the pin member 47 is positioned when the upstream flap 41 is in the second state.

In the present embodiment, the first region R1 is formed by a curved surface, and the second region R2 is formed by a flat surface. In FIGS. 10 and 11, an arrow d1 indicates a direction away from the axial center position Cl and is a first direction parallel to a tangential line at a position where the pin member 47 comes into contact with the first region R1 in the first state of the upstream flap 41. An arrow d2 indicates a direction away from the axial center position Cl and is a second direction parallel to the second region R2 with which the pin member 47 comes into contact in the second state of the upstream flap 41. The second direction d2 is a direction intersecting the first direction d1.

In addition, an angle $\alpha 1$ is an angle formed by the first direction d1 and the suction direction Q1, and an angle $\alpha 2$ is an angle formed by the second direction d1 and the suction direction Q2.

In the present embodiment, the angle $\alpha 2$ is smaller than the angle $\alpha 1$. Thereby, the rotation angle of the upstream flap 41 with respect to the unit movement amount of the plunger 46 when the pin member 47 is located in the second region R2 is smaller than that when the pin member 47 is located in the first region R1.

Thus, the operation of the upstream flap 41 becomes slower when the pin member 47 comes into contact with the second region R2 than when the pin member 47 comes into contact with the first region R1. As a result, a variation in the posture of the upstream flap 41 when the plunger 46 is suctioned is suppressed, the posture of the upstream flap 41 in the second state can be made appropriate, and it is possible to cope with the above-described first problem.

In contrast, the rotation angle of the upstream flap 41 with respect to the unit movement amount of the plunger 46 is larger when the pin member 47 comes into contact with the first region R1 than when the pin member 47 comes into contact with the second region R2, and thus the amount of operation of the upstream flap 41 is larger when the pin member 47 is located in the first region R1 than when the pin member 47 is located in the second region R2. Thereby, it is possible to secure the amount of operation of the upstream flap 41, reliably switch a conveyance path, and cope with the above-described second problem.

Note that, in the present embodiment, the angle α2 is an acute angle. Thereby, the operation of the link member 43, that is, the upstream flap 41, when the pin member 47 is located in the second region R2 can be appropriately slowed down, and a variation in the posture of the upstream flap 41 when the plunger 46 is suctioned can be appropriately suppressed.

Further, in the present embodiment, the angle α1 is an obtuse angle. Thus, the amount of operation of the link member 43, that is, the upstream flap 41, when the pin member 47 is located in the first region R1 can be appropriately increased. Note that the angle α1 may be 90 degrees.

In addition, as illustrated in FIG. 4, the printer 1 includes the first path forming member 109 that forms a medium conveyance path, and the posture of the upstream flap 41 in the first state is regulated when the path switching member abuts on the abutting portion 109*a* of the first path forming member 109 in the return state of the solenoid 45. Thus, the posture of the upstream flap 41 in the first state can be appropriately regulated.

In addition, as illustrated in FIG. 6, the printer 1 includes the coil spring 44 as a pressing member that presses the upstream flap 41 in a direction in which the upstream flap 41 abuts on the first path forming member 109. Thus, the posture of the upstream flap 41 in the first state is stabilized.

In addition, as illustrated in FIGS. 4 and 5, when viewed from the Y-axis direction, that is, a medium width direction intersecting the medium conveyance direction, the axial center position Cl, which is the center of rotation of the upstream flap 41, is closer to the first path forming member 109 than to the pin member 47.

In addition, as illustrated in FIG. 5, the printer 1 includes the second path forming member 108 that forms a medium conveyance path at a position facing the first path forming member 109, the second path forming member 108 is provided with the detection unit 48 for detecting a medium, and the upstream flap 41 forms a gap between the upstream flap 41 and the concave portion 108*a* of the second path forming member 108 in the second state. Thereby, it is possible to suppress the occurrence of noise or the occurrence of adverse effects on the detection unit 48 due to the upstream flap 41 abutting on the second path forming member 108.

In addition, as described above, the second path forming member 108 is provided with the concave portion 108*a* that the tip end of the upstream flap 41 enters into when the upstream flap 41 is in the second state, and thus it is possible to prevent the medium from being caught by the tip portion 41*a* when passing through the tip portion 41*a* of the upstream flap 41.

Next, another embodiment of a groove portion formed in the link member 43 will be described with reference to FIG. 13.

Figure 13:
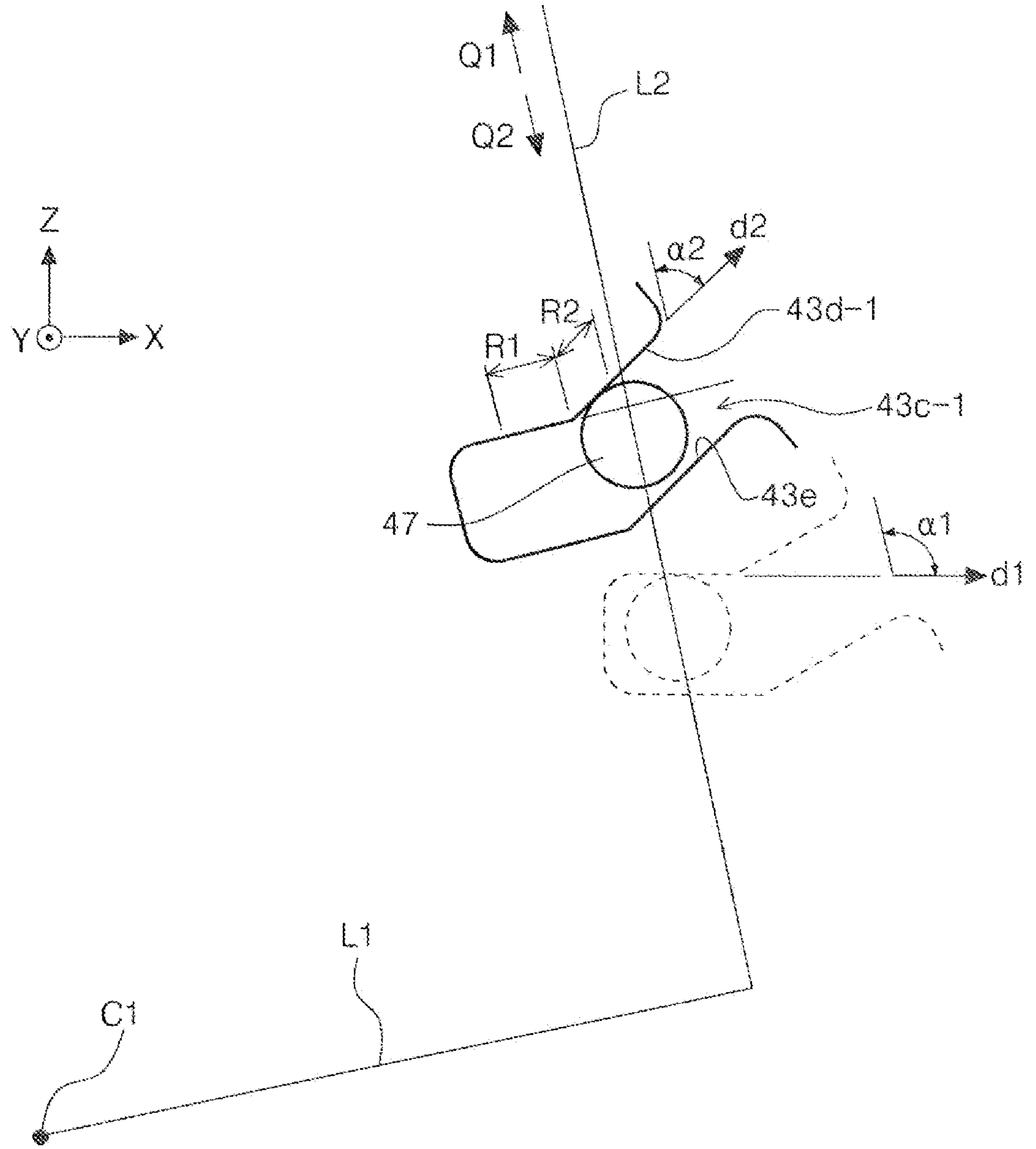
FIG. 13 is a partially enlarged view of the lever when the upstream flap is in the second state.

In FIG. 13, reference numeral 43*c*-1 denotes a groove portion according to a second embodiment, and reference numeral 43*d*-1 denotes a first contact surface according to the second embodiment.

The first contact surface 43*d*-1 is formed in a non-linear shape to have a first region R1 where a pin member 47 is located when an upstream flap 41 is in a first state and a second region R2 where the pin member 47 is located when the upstream flap 41 is in a second state.

In the present embodiment, both the first region R1 and the second region R2 are formed by flat surfaces. An arrow d1 indicates a first direction away from an axial center position Cl and parallel to the first region R1, and an arrow d2 indicates a second direction away from the axial center position Cl and parallel to the second region R2 with which the pin member 47 comes into contact in the second state of the upstream flap 41. A second direction d2 is a direction intersecting a first direction d1.

The first region R1 extends in the first direction d1, and the second region R2 extends in the second direction d2.

In addition, an angle α1 is an angle formed by the first direction d1 and the suction direction Q1, and an angle α2 is an angle formed by the second direction d1 and a suction direction Q2.

In the present embodiment, the angle α2 is smaller than the angle α1. Thus, the operation of a link member 43, that is, the upstream flap 41, becomes slower when the pin member 47 comes into contact with the second region R2 than when the pin member 47 comes into contact with the first region R1. Thereby, a variation in the posture of the upstream flap 41 when a plunger 46 is suctioned is suppressed, the posture of the upstream flap 41 in the second state can be made appropriate, and it is possible to cope with the above-described first problem.

In contrast, the angle α1 is larger than the angle α2, and thus the amount of operation of the link member 43, that is, the upstream flap 41, is larger when the pin member 47 comes into contact with the first region R1 than when the pin member 47 comes into contact with the second region R2. Thereby, it is possible to secure the amount of operation of the upstream flap 41, reliably switch a conveyance path, and cope with the above-described second problem.

Further, in the present embodiment, the angle α2 is an acute angle. Thereby, the operation of the link member 43, that is, the upstream flap 41 when the pin member 47 is located in the second region R2 can be appropriately slowed down, and a variation in the posture of the upstream flap 41 when the plunger 46 is suctioned can be appropriately suppressed.

Further, in the present embodiment, the angle α1 is an obtuse angle. Thus, the amount of operation of the link member 43, that is, the upstream flap 41 when the pin member 47 is located in the first region R1 can be appropriately increased. Note that the angle α1 may be 90 degrees.

The present disclosure is not limited to the above-described embodiments, various modifications can be made within the scope of the present disclosure as described in the claims, and it is needless to say that the modifications also fall within the scope of the present disclosure.

For example, a flap driven by a solenoid 45 and the link member 43 is not limited to the upstream flap 41 and may be any of other flaps.

In addition, an example in which the medium conveyance device is applied to the recording device has been described in the above-described embodiments, but the invention is not limited thereto and may be applied to other devices, for example, an image reading device that reads an image of a document.

What is claimed is:

1. A medium conveyance device comprising:

a branching portion where a conveyance path of a medium branches into a first conveyance path and a second conveyance path;

a path switching member that is a member provided in the branching portion and rotates to switch between a first state where a moving direction of the medium is set to the first conveyance path and a second state where the moving direction of the medium is set to the second conveyance path;

a solenoid that rotates the path switching member by a plunger configured to be displaced in a suction direction and a return direction opposite to the suction direction; and a link member that is a member provided in the path switching member and engages with the plunger, wherein the link member includes a groove portion, the plunger includes a pin member that moves in the groove portion in association with the displacement operation, the solenoid regulates, in a suction state, a posture of the path switching member in the second state, a contact surface that is an inner surface of the groove portion and with which the pin member comes into contact when the plunger moves in the suction direction is formed in a non-linear shape to have a first region and a second region, the first region being a region extending in a first direction away from the center of rotation of the path switching member, and the second region being a region extending in a second direction away from the center of rotation and intersecting the first direction, and an angle formed by the suction direction and the second direction is smaller than an angle formed by the suction direction and the first direction.

2. The medium conveyance device according to claim 1, wherein the angle formed by the suction direction and the second direction is an acute angle.

3. The medium conveyance device according to claim 1, wherein the angle formed by the suction direction and the first direction is 90° or an obtuse angle.

4. The medium conveyance device according to claim 1, wherein a device main body including the conveyance path includes a first unit that is configured to open and close and a second unit that is configured to open and close inside the first unit, the second conveyance path is exposed by opening the first unit, and the first conveyance path is exposed by opening the second unit.

5. A recording device comprising:

the medium conveyance device according to claim 1; and a recording unit configured to perform recording on the medium conveyed by the medium conveyance device.

6. The recording device according to claim 5, wherein the first conveyance path is a path for discharging the medium on which recording was performed by the recording unit, and the second conveyance path is a path for reversing front and back sides of the medium on which recording was performed by the recording unit.

7. A medium conveyance device comprising:

a branching portion where a conveyance path of a medium branches into a first conveyance path and a second conveyance path;

a path switching member that is a member provided in the branching portion and rotates to switch between a first state where a moving direction of the medium is set to the first conveyance path and a second state where the moving direction of the medium is set to the second conveyance path;

a solenoid that rotates the path switching member by a plunger configured to be displaced in a suction direction and a return direction opposite to the suction direction; and a link member that is a member provided in the path switching member and engages with the plunger, wherein the link member includes a groove portion, the plunger includes a pin member that moves in the groove portion in association with the displacement operation, the solenoid regulates, in a suction state, a posture of the path switching member in the second state, a contact surface that is an inner surface of the groove portion and with which the pin member comes into contact when the plunger moves in the suction direction is formed in a non-linear shape to have a first region and a second region, the first region being a region in which the pin member is located when the path switching member is in the first state, and the second region being a region in which the pin member is located when the path switching member is in the second state, and a rotation angle of the path switching member with respect to a unit movement amount of the plunger when the pin member is located in the second region is smaller than that when the pin member is located in the first region.

8. The medium conveyance device according to claim 7, further comprising:

a first path forming member that forms the conveyance path, wherein a posture of the path switching member in the first state is regulated when the path switching member abuts on the first path forming member in a state where the solenoid is returned.

9. The medium conveyance device according to claim 8, further comprising a pressing member that presses the path switching member in a direction in which the path switching member abuts on the first path forming member.

10. The medium conveyance device according to claim 8, wherein the center of rotation of the path switching member is closer to the first path forming member than the to pin member when viewed from a medium width direction intersecting a medium conveyance direction.

11. The medium conveyance device according to claim 8, further comprising:

a second path forming member that forms the conveyance path at a position facing the first path forming member, wherein the second path forming member is provided with a detection unit for detecting the medium, and the path switching member forms a gap between the path switching member and the second path forming member in the second state.

12. The medium conveyance device according to claim 8, further comprising:

a second path forming member that forms the conveyance path at a position facing the first path forming member, wherein the second path forming member is provided with a concave portion into which a tip of the path switching member enters when the path switching member is in the second state.

13. A recording device comprising:

the medium conveyance device according to claim 7; and a recording unit configured to perform recording on the medium conveyed by the medium conveyance device.

14. The recording device according to claim 13, wherein the first conveyance path is a path for discharging the medium on which recording was performed by the recording unit, and the second conveyance path is a path for reversing front and back sides of the medium on which recording was performed by the recording unit.

* * * * *